(12) United States Patent
Chung et al.

(10) Patent No.: US 12,525,397 B2
(45) Date of Patent: Jan. 13, 2026

(54) CAPACITOR COMPONENT AND MANUFACTURING METHOD OF CAPACITOR COMPONENT

(71) Applicant: SAMSUNG ELECTRO-MECHANICS CO., LTD., Suwon-si (KR)

(72) Inventors: Hae Suk Chung, Suwon-si (KR); Woon Kyung Lee, Suwon-si (KR); Jung Sub Choi, Suwon-si (KR); Gwang Pyo Park, Suwon-si (KR); Ji Hoon Park, Suwon-si (KR); Jun Goo Won, Suwon-si (KR); Hyun Goo Jeon, Suwon-si (KR); Kwang Mook Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 119 days.

(21) Appl. No.: 18/380,810

(22) Filed: Oct. 17, 2023

(65) Prior Publication Data

US 2024/0222011 A1 Jul. 4, 2024

(30) Foreign Application Priority Data

Dec. 29, 2022 (KR) .......... 10-2022-0189358
Feb. 3, 2023 (KR) .......... 10-2023-0014832

(51) Int. Cl.
*H01G 4/08* (2006.01)
*H01G 4/008* (2006.01)
*H01G 4/224* (2006.01)

(52) U.S. Cl.
CPC ............ *H01G 4/008* (2013.01); *H01G 4/224* (2013.01); *H01G 4/08* (2013.01)

(58) Field of Classification Search
CPC .......... H01G 4/008; H01G 4/224; H01G 4/08
See application file for complete search history.

(56) References Cited

U.S. PATENT DOCUMENTS 6,934,144 B2 * 8/2005 Ooma .................. B82Y 10/00
  977/932
7,057,881 B2 * 6/2006 Chow .................. H01G 4/06
  361/512

(Continued)

FOREIGN PATENT DOCUMENTS

JP 2016058618 A * 4/2016
JP 2016-518702 A 6/2016

(Continued)

OTHER PUBLICATIONS

Translation JP 618 (Year: 2016).*
Translation KR 465 (Year: 2007).*

*Primary Examiner* — Dion R. Ferguson
(74) *Attorney, Agent, or Firm* — Morgan, Lewis & Bockius LLP

(57) ABSTRACT

A capacitor component may include: first and second connection conductive layers; a plurality of conductive nanowires respectively connecting the first and second connection conductive layers; a conductive body disposed between the first and second connection conductive layers to have a plurality of through-holes in which the plurality of conductive nanowires are disposed; and a dielectric film disposed so that at least a portion thereof is disposed between the plurality of conductive nanowires and the conductive body in the plurality of through-holes, wherein an aspect ratio, which is a ratio of a length to a width of one of the plurality of conductive nanowires, may be 1000 or more.

16 Claims, 20 Drawing Sheets

(56) References Cited

U.S. PATENT DOCUMENTS

| | | | |
|---|---|---|---|
| 2005/0083635 A1* | 4/2005 | Ooma | H01G 4/33 |
| | | | 361/305 |
| 2010/0178568 A1* | 7/2010 | Unalan | H01M 4/1393 |
| | | | 427/249.1 |
| 2011/0043967 A1* | 2/2011 | Kim | H01G 9/0029 |
| | | | 29/25.03 |
| 2013/0224394 A1* | 8/2013 | Hanbuecken | H01G 4/38 |
| | | | 977/948 |
| 2017/0222216 A1* | 8/2017 | Woo | H01M 4/66 |
| 2019/0088800 A1 | 3/2019 | Takeuchi et al. | |
| 2019/0096587 A1 | 3/2019 | Shin et al. | |
| 2019/0103234 A1* | 4/2019 | Yang | H01G 11/24 |
| 2023/0064255 A1 | 3/2023 | Lee et al. | |
| 2023/0127398 A1* | 4/2023 | Lee | H01G 4/005 |
| | | | 361/304 |
| 2024/0222011 A1* | 7/2024 | Chung | H01G 4/224 |

FOREIGN PATENT DOCUMENTS

| | | | | |
|---|---|---|---|---|
| JP | WO2017/221750 A1 | 12/2017 | | |
| JP | 2018-053335 A | 4/2018 | | |
| KR | 20070109465 A * | 11/2007 | | H01G 4/30 |
| KR | 10-1773103 B1 | 8/2017 | | |
| KR | 10-1922116 B1 | 11/2018 | | |
| KR | 10-2019-0037045 A | 4/2019 | | |
| KR | 10-2023-0033458 A | 3/2023 | | |
| KR | 10-2023-0059551 A | 5/2023 | | |
| WO | 2014/150747 A1 | 9/2014 | | |
| WO | WO-2022094767 A1 * | 5/2022 | | H01G 7/06 |

\* cited by examiner

CAPACITOR COMPONENT AND MANUFACTURING METHOD OF CAPACITOR COMPONENT

CROSS-REFERENCE TO RELATED APPLICATION(S)

This application claims benefit of priority to Korean Patent Application Nos. 10-2022-0189358 filed on Dec. 29, 2022 in the Korean Intellectual Property Office, and 10-2023-0014832 filed on Feb. 3, 2023 in the Korean Intellectual Property Office, the disclosures of which are incorporated herein by reference in its entirety.

TECHNICAL FIELD

The present disclosure relates to a capacitor component and a manufacturing method of the capacitor component.

With the ongoing development of technology, demand for electronic components in a form of chips having high capacitance in a small volume is increasing. Accordingly, in recent years, as IT products such as a smartphone, a personal digital assistant, a digital video camera, a digital still camera, a network system, a computer, a monitor, a tablet, a laptop, a netbook, a television, a video game, a smartwatch, an automotive, and the like, a capacitor used in the IT products are also required to be miniaturized and to have high capacitance. Performances that are becoming increasingly important among the performances of capacitor components may be equivalent series inductance (ESL), capacitance per unit volume, and thinner thickness compared to unit capacitance.

A multilayer ceramic capacitor (MLCC) may use a material having high permittivity with a perovskite structure as a dielectric, and may have a structure in which a plurality of dielectric layers, which are repeatedly deposited, are connected in parallel, and a distance between electrodes is close while a thickness of the dielectric layer is reduced, capacitance may be effectively increased. However, the MLCC may have limitations in lowering the ESL or reducing the thickness, and as the MLCC is miniaturized, it may become increasingly difficult to secure a breakdown voltage (BDV).

SUMMARY

An aspect of the present disclosure is to provide a capacitor component and a manufacturing method of the capacitor component, which may be advantageous in reducing ESL or a thickness thereof compared to an MLCC, and may also obtain capacitance increasing efficiency (which does not mean relative efficiency with respect to the MLCC).

According to an aspect of the present disclosure, a capacitor component may include: first and second connection conductive layers; a plurality of conductive nanowires respectively connecting the first and second connection conductive layers; a conductive body disposed between the first and second connection conductive layers to have a plurality of through-holes in which the plurality of conductive nanowires are disposed; and a dielectric film disposed so that at least a portion thereof is disposed between the plurality of conductive nanowires and the conductive body in the plurality of through holes. An aspect ratio, which is a ratio of a length to a width of one of the plurality of conductive nanowires, may be 1000 or more.

According to an aspect of the present disclosure, a manufacturing method of a capacitor component, may include operations of: forming a bundle of a plurality of conductive nanowires covered with alumina; forming a wafer by vertically cutting the bundle of nanowires; forming first and second connection conductive layers on one surface and the other surface of the wafer so that the plurality of conductive nanowires are connected to each other; forming a space inside the wafer by removing the alumina from the wafer; forming a dielectric film on a surface of each of the plurality of conductive nanowires and surfaces of the first and second connection conductive layers, by depositing a dielectric material on the wafer; and forming a conductive body filling the space, by depositing a conductive material on the wafer.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
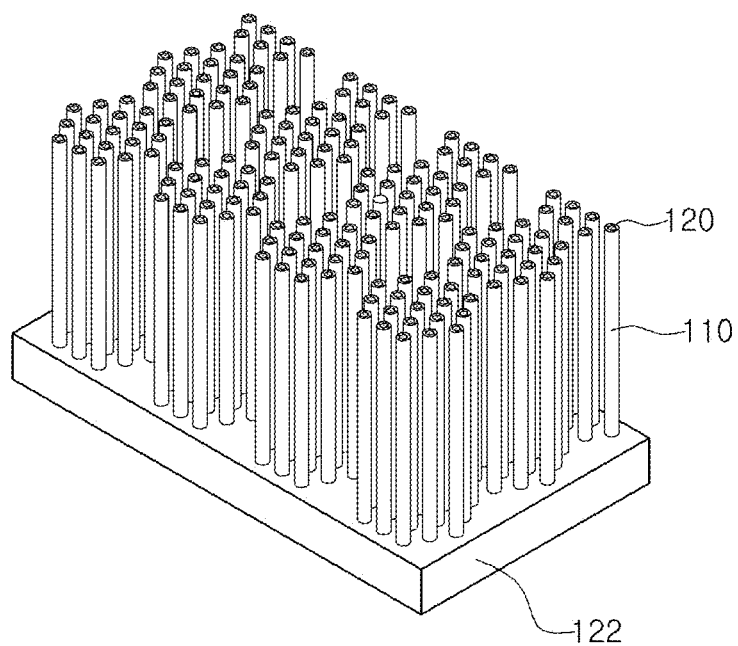
FIG. 1 is a diagram schematically illustrating a second connection conductive layer, a conductive nanowire, and a dielectric film in a capacitor component according to an embodiment of the present disclosure.

Hereinafter, preferred embodiments of the present disclosure will be described with reference to the accompanying drawings. However, the embodiments of the present disclosure may be modified in many different forms, and the scope of the present disclosure is not limited to the embodiments described below. In addition, the embodiments of the present invention are provided to more completely explain the present disclosure to those skilled in the art. Shapes and sizes of elements in the drawings may be exaggerated for clear description. In addition, components having the same function within the scope of the same concept illustrated in the drawings of each embodiment are described using the same reference numerals. X, Y, and Z indicated in the drawing may mean a longitudinal direction, a width direction, and a thickness direction of a capacitor component, respectively. In addition, throughout the specification, when a component is referred to as "comprise" or "comprising," it means that it may further include other components as well, rather than excluding other components, unless specifically stated otherwise.

Referring to FIGS. 1 to 4, a capacitor component 1 according to the present embodiment includes a plurality of conductive nanowires 120 as a first electrode portion, first and second connection conductive layers 121 and 122, and a dielectric film 110, a conductive body 130 as a second electrode portion, first and second terminals 141 and 142, and a protective layer 150.

The first electrode portion includes a plurality of conductive nanowires 120. Each of the plurality of conductive nanowires 120 extends in a Z-direction, and is disposed to be spaced apart from each other in an X-direction and/or a Y-direction, perpendicular to the Z-direction. Meanwhile, hereinafter, the first electrode portion will be referred to as a plurality of conductive nanowires 120 and used.

The plurality of conductive nanowires 120 are physically and electrically connected to each other by first and second connection conductive layers 121 and 122 to be described later.

Each of the conductive nanowires 120 may be formed of a conductive material. As a non-limiting example, each conductive nanowire 120 may be formed of a metal including at least one of nickel (Ni), cobalt (Co), titanium (Ti), tungsten (W), palladium (Pd), and copper (Cu), or an alloy thereof. Alternatively, each conductive nanowire 120 may be formed of a conductive ceramic such as titanium nitride (TiN) or tungsten nitride (WN).

Each of the conductive nanowires 120 may have, for example, a crystalline alloy, an amorphous alloy, or an amorphous mixed-phase structure including nano-sized crystal grains. For example, a crystal structure of the conductive nanowires 120 may be controlled by controlling environments (cooling rate, formation rate) in which the conductive nanowires 120 are formed, but the scope of the present disclosure is not limited thereto.

The plurality of conductive nanowires 120 may have the same or different materials. As an example, all of the plurality of conductive nanowires 120 may be nickel (Ni) nanowires. As another example, a portion of the plurality of conductive nanowires 120 may be nickel (Ni) nanowires, and a remainder of the plurality of conductive nanowires 120 may be copper (Cu) nanowires. As another example, the plurality of conductive nanowires 120 may include metal nanowires, alloy nanowires, and conductive ceramic nanowires.

The plurality of conductive nanowires 120 may have a shape of at least one of a circular columnar shape and a polygonal columnar shape. For example, all of the plurality of conductive nanowires 120 may have a circular columnar shape. As another example, all of the plurality of conductive nanowires 120 may have polygonal columnar shapes. As another example, a portion of the plurality of conductive nanowires 120 may have a circular column shape, and others of the plurality of conductive nanowires 120 may have a polygonal columnar shape.

Figure 4:
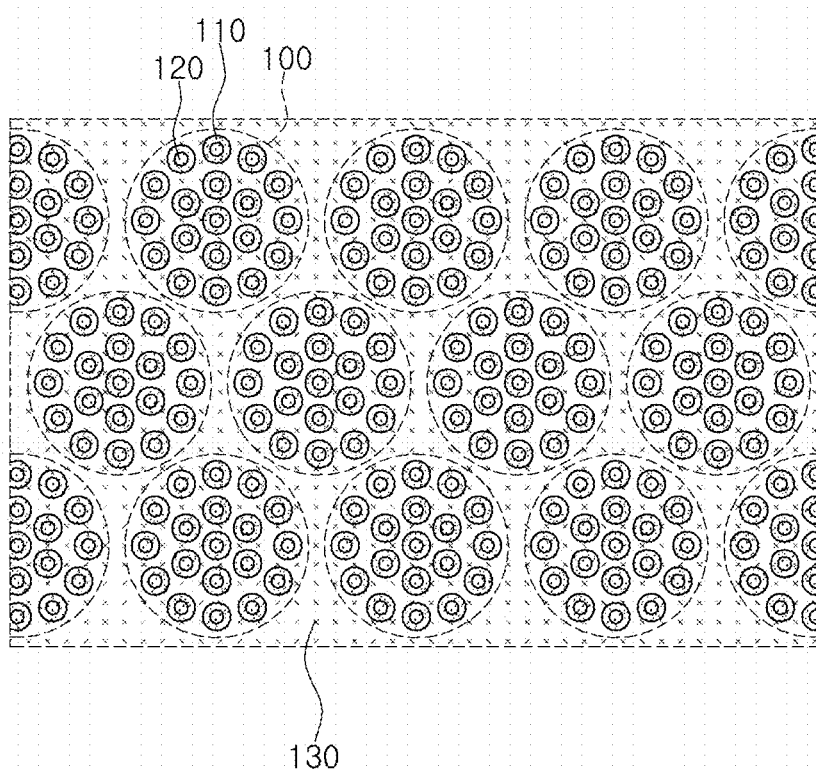
FIGS. 4 to 7 are diagrams schematically illustrating a dispositional form of a bundle of conductive nanowires in a capacitor component according to an embodiment of the present disclosure.
Figure 5:
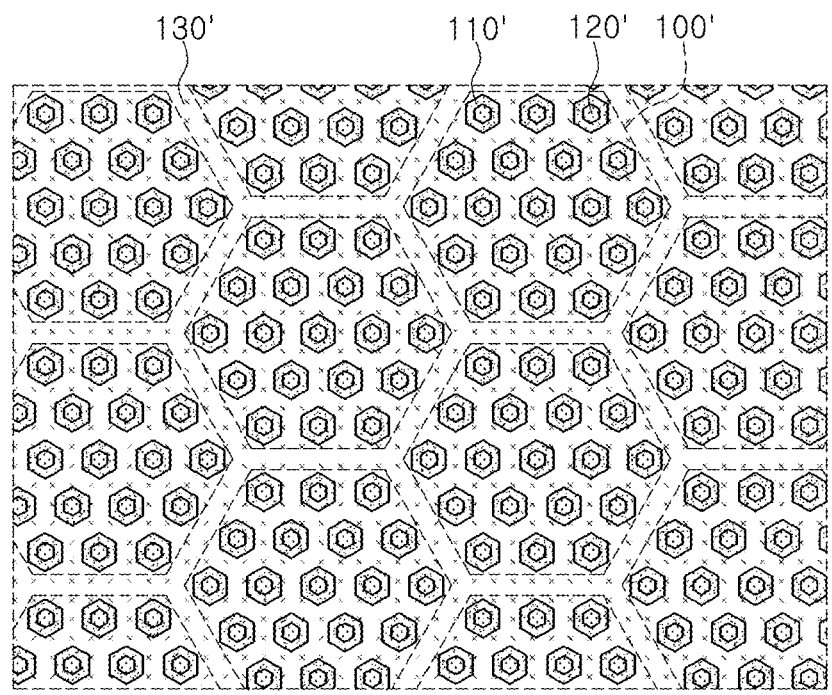
Figure 6:
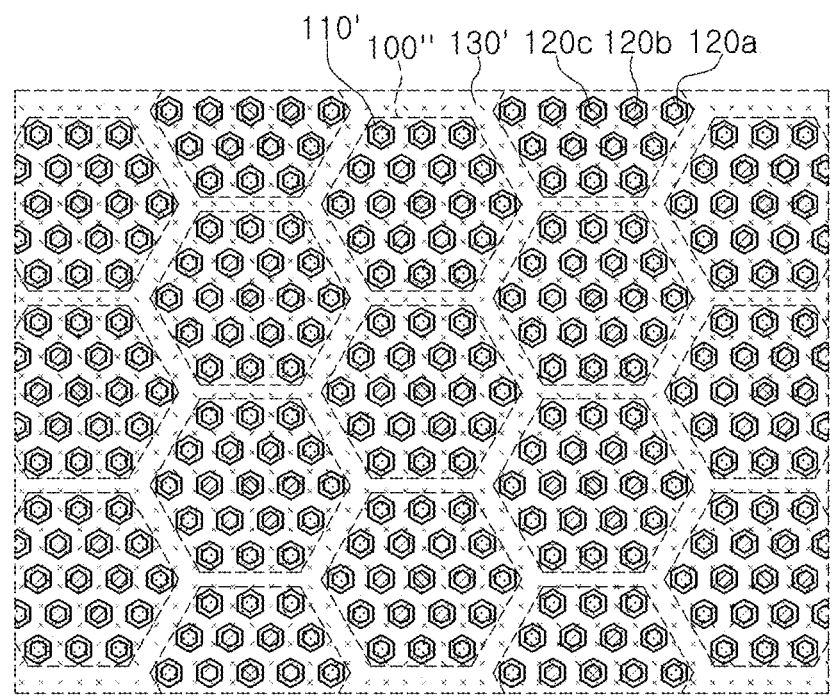
Figure 7:
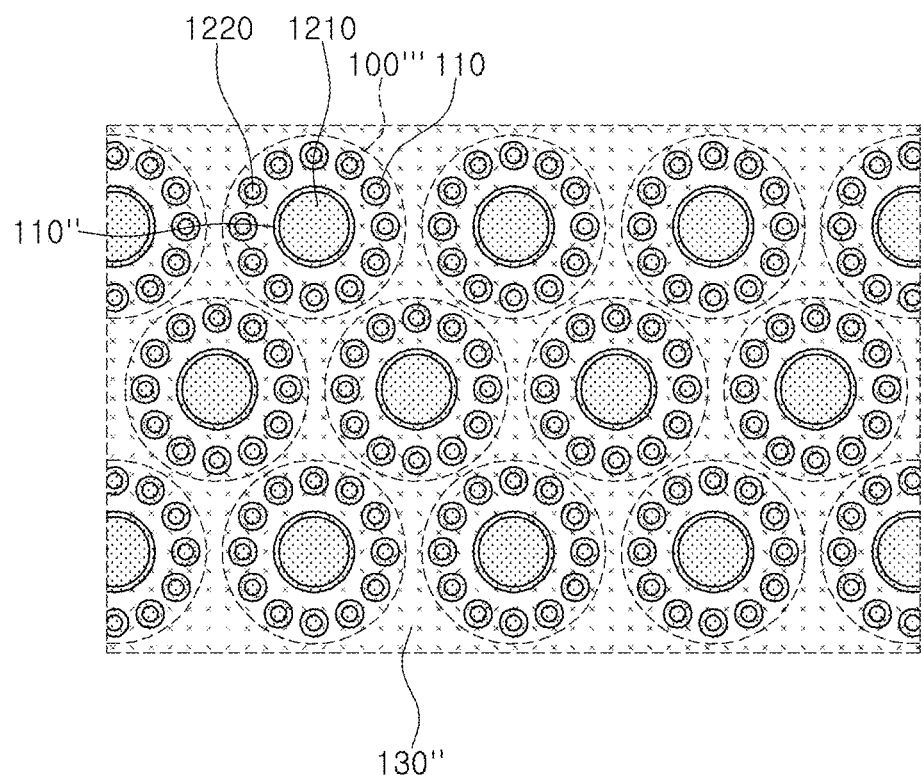

A portion of the plurality of conductive nanowires 120 may form a bundle, and the bundle of the plurality of conductive nanowires 100 may be disposed to form a repeated pattern. For example, as illustrated in FIGS. 4 and 7, a bundle of a plurality of conductive nanowires 100 and 100''' may have a circular cross-section overall. In addition, as illustrated in FIGS. 5 and 6, the bundle of the plurality of conductive nanowires 100' and 100'' may have a hexagonal cross-section overall. In addition, as illustrated in FIGS. 4 and 7, the bundle of the plurality of conductive nanowires 100, 100', 100'', 100''' may be disposed such that bundles of circular cross-sections or hexagonal cross-sections are repeatedly disposed to form a pattern.

Within any one of the bundle of the plurality of conductive nanowires 100, 100', 100'', 100''', one conductive nanowire 120 and the other conductive nanowire 120 may have different widths, different materials, or different cross-sectional shapes. For example, as illustrated in FIG. 6, the bundle of nanowires 100 may include conductive nanowires 120a, 120b, and 120c having different conductive materials. In this case, the shapes of the conductive nanowires 120a, 120b, and 120c within the bundle may be identical to each other. As another example, as illustrated in FIG. 7, the bundle of nanowires 100''' may include conductive nanowires 1210 and 1220 having different widths, but a central portion of the bundle 100''' may have a structure in which the conductive nanowires 1210 having a large width are disposed, and a peripheral portion thereof may have a structure in which the conductive nanowires 1220 having a small width are disposed.

The first connection conductive layer 121 is disposed in one end portion of the plurality of conductive nanowires 120 to connect the plurality of conductive nanowires 120 to each other. The second connection conductive layer 122 is disposed in the other end portion of the plurality of conductive nanowires 120 to connect the plurality of conductive nanowires 120 to each other. The connection conductive layers 121 and 122 may extend on an X-Y plane from the top and bottom of the plurality of conductive nanowires 120 to cover both ends of the plurality of conductive nanowires 120, respectively, and may have a plate-like shape overall. The connection conductive layers 121 and 122 connect the plurality of conductive nanowires 120 in parallel to each other.

The connection conductive layers 121 and 122 may be formed of a conductive material. As a non-limiting example, the connection conductive layers 121 and 122 may be formed of a metal containing at least one of nickel (Ni), cobalt (Co), titanium (Ti), tungsten (W), palladium (Pd), and copper (Cu), or an alloy thereof. Alternatively, the connection conductive layers 121 and 122 may be forme d of conductive ceramics such as titanium nitride (TiN), tungsten nitride (WIN), and the like. The connection conducive lavers 121 and 122 and the conductive nanowires 120 may be formed of the same material, and as an example, each of the connection conductive layers 121 and 122 and the conductive nanowires 120 may be formed of nickel (Ni).

The connection conductive layers 121 and 122 may be formed by, for example, a thin film process such as vapor deposition, a plating process, or a (lamination process of laminating conductive films, but an embodiment thereof is not limited thereto.

The conductive body 130 surrounds the plurality of conductive nanowires 120. The conductive body 130 forms an overall appearance of a capacitor component 1 according to the present embodiment, and functions as a second electrode portion of the capacitor component 1. That is, a dielectric film 110 to be described later is disposed between each of the plurality of conductive nanowires 120 and the conductive body 130, and charges of different polarities are applied to each of the plurality of conductive nanowires 120 and the conductive body 130 to form capacitance in the dielectric film 110.

The conductive body 130 fills spaced spaces between the plurality of conductive nanowires 120 whose sides are covered by a dielectric film 110 to be described later. In addition, the conductive body 130 is formed on the upper surface of the first connection conductive layer 121 connecting one end of the plurality of conductive nanowires 120. The conductive body 130 may not be disposed on the second connection conductive layer 122 connecting the other ends of the plurality of conductive nanowires 120, but the scope of the present embodiment is not limited thereto.

The conductive body 130 may be formed of a conductive material. As a non-limiting example, the conductive body 130 may include metal including at least one of nickel (Ni), cobalt (Co), titanium (Ti), tungsten (W), palladium (Pd) and copper (Cu), or an alloy thereof. Alternatively, the conductive body 130 may be formed of conductive ceramics such as titanium nitride (TiN), tungsten nitride (WN), and the like.

The conductive body 130 may be formed by, for example, a thin film formation process such as vapor deposition, a plating process, or the like, but an embodiment thereof is not limited thereto. As a non-limiting example, the conductive body 1130 may be formed by atomic layer deposition (ALD).

The dielectric film 110 is disposed between each of the plurality of conductive nanowires 120 and the conductive body 130 in a form covering an outer circumferential surface of the plurality of conductive nanowires 120. That is, the dielectric film 110 serves as a separator to prevent an electrical short-circuit between the plurality of conductive nanowires 120 and the conductive body 130. As described above, since both ends of the conductive nanowires 120 are in contact with and connected to the connection conductive layers 121 and 122, the dielectric film 110 is not disposed between both ends of the conductive nanowire 120 and the connection conductive layers 121 and 122. In addition, the dielectric film 110 is disposed between each of the connection conductive layers 121 and 122 and the conductive body 130. Meanwhile, unlike the second connection conductive layer 122, the first connection conductive layer 121 may have a structure in which an entire surface thereof is covered by the dielectric film 110.

The dielectric layer 110 may include, for example, a high-k material having a specific dielectric constant of 3 or more. As a non-limiting example, the dielectric film 110 may include at least one oxide selected from tantalum (Ta), titanium (Ti), lanthanum (La), zirconium (Zr), barium (Ba), silicon (Si), and hafnium (Hf). As a non-limiting example, the dielectric film 110 may be disposed in a multilayer structure. In this case, the dielectric film 110 may have a double layer structure in which an oxide film containing the above-described oxide and a nitride film containing a nitride such as silicon nitride (SiN) are sequentially disposed, but the scope of the present embodiment is not limited thereto.

The dielectric film 110 may be formed by vapor deposition such as, for example, atomic layer deposition (ALD), chemical vapor deposition (CVD), or the like, but an embodiment thereof is not limited thereto.

The protective layer 150 covers a conductive body 130 and a second connection conductive layer 122. The protective layer 150 may serve to protect the capacitor component 1 from external impacts, conductive foreign substances, or the like. The protective layer 150 may cover an outer surface of the first connection conductive layer 121 and an outer surface of the second connection conductive layer 122, and may surround the conductive body 130. The protective layer 150 may provide an upper outer surf-ace and a lower outer surface of the capacitor component.

The protective layer 150 may include, for example, polystyrene-based, vinyl acetate-based, polyester-based, polyethylene-based, polypropylene-based, polyamide-based, rubber-based, a thermoplastic resin such as acrylic, a thermoplastic resin such as acrylic, a thermosetting resin such as phenol, epoxy, urethane, melamine, or alkyd, a photosensitive resin, or parylene, and may be formed of a material different from silicon (Si).

The protective layer 150 may be, formed by, for example, applying a liquid insulating resin, laminating an insulating film, or vapor deposition. In the case of the insulating film, a dry film (DF) containing a photosensitive insulating resin, an Ajinomoto Build-up Film (ABF), a polyimide film, or the like not containing a photosensitive insulating resin may be used.

The first terminal 141 may be electrically connected to a first connection conductive layer 121, and a portion of the first terminal 141 may be exposed through the protective layer 150 to be an anode or a cathode. The second terminal 142 may be electrically connected to the conductive body 130, and a portion of the second terminal 142 may be exposed through the protective layer 150 to be a cathode or an anode having a polarity different from that of the first terminal 141.

The terminals 141 and 142 may be formed of a conductive material including at least one of copper (Cu), silver (Ag), nickel (Ni), and tin (Sn). The terminals 141 and 142 may be formed by at least one of a paste printing process, a plating process, or a thin film process such as vapor deposition, but the present disclosure is not limited thereto. The terminals 141 and 142 may be formed as a multilayer structure, but the present disclosure is not limited thereto.

Figure 8:
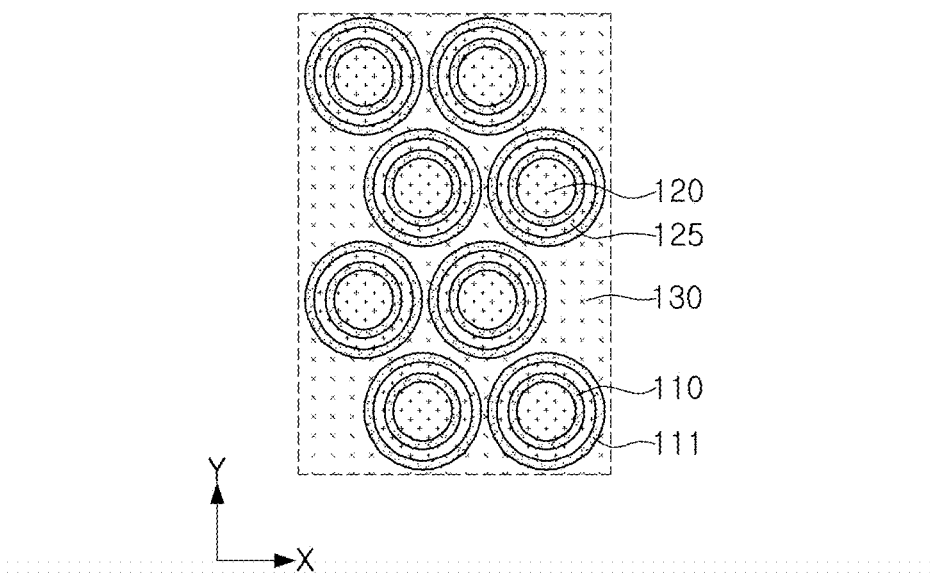
FIG. 8 is a view schematically illustrating a cross-section of a capacitor component according to another embodiment of the present disclosure.

Referring to FIG. 8, a capacitor component according to another embodiment of the present disclosure may further include a barrier metal film 125 and a barrier dielectric film lll, compared to the capacitor component according to an embodiment of the present disclosure. Therefore, in describing the capacitor component according to the present embodiment, only the barrier metal film 125 and the barrier dielectric film 111, which are different from those in the embodiment of the present disclosure, will be described, and for the remainder of the configuration, the description in an embodiment of the present disclosure may be equally applied.

The barrier metal film 125 may be formed to surround an outer circumferential surface of the dielectric film 110 surrounding side surfaces of the plurality of conductive nanowires 120. In addition, the barrier dielectric film 111 may be formed to surround the outer circumferential surface of the barrier metal film 125 surrounding an outer circumferential surface of the dielectric film 110. That is, the barrier metal film 125 and the barrier dielectric film 111 may be sequentially disposed between the dielectric layer 110 and the conductive body 130. The barrier metal film 125 and the harrier dielectric film 111 may block transfer of charges or ions from the dielectric layer 110 to the conductive body 130.

Hereinafter, a manufacturing method of a capacitor according to an embodiment of the present disclosure will be described. A capacitor component 1 of the present disclosure may be manufactured in the following order.

Figure 12:
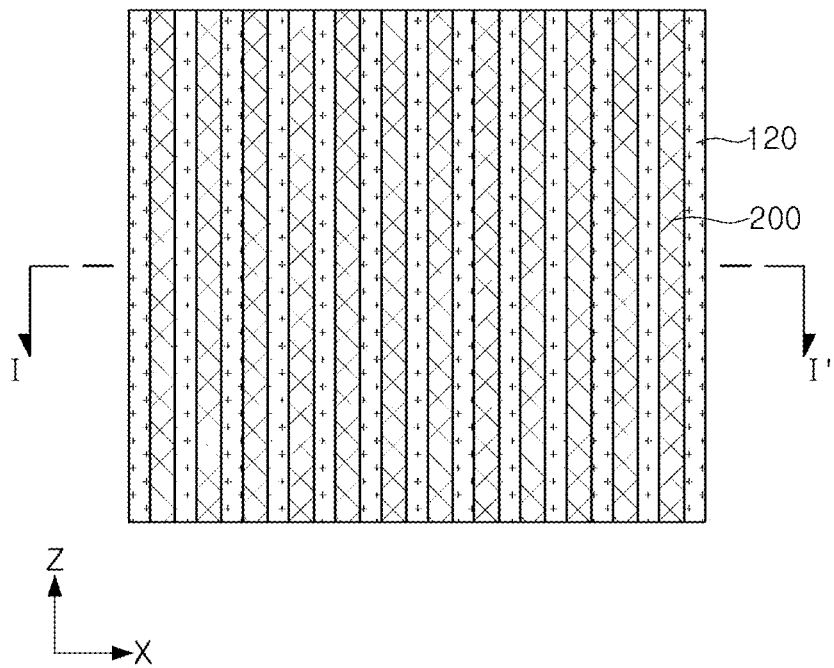
FIGS. 12 to 22 are views illustrating a process of manufacturing a capacitor component according to an embodiment of the present disclosure.
Figure 13:
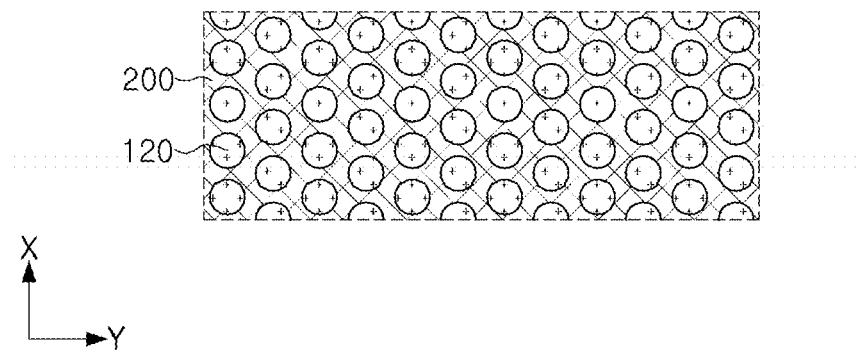

Referring to FIGS. 12 and 13, first, a bundle of nanowires including a plurality of nanowires in which a plurality of conductive nanowires 120 are covered with alumina 200 is prepared. A base of the bundle of nanowires may be heat treated and a binder may be hardened to prepare a bundle of nanowires.

In the present embodiment, a plurality of nanowires may be tied into one to form a bundle of nanowires, and the bundle of nanowires may be vertically cut and sliced into a thin plate shape to prepare a wafer having a three-dimensional structure including a plurality of vertically erected metal conductive nanowires. Here, alumina 200 is a material for binding.

As described above, when a three-dimensional structure composed of a bundle of nanowires is fixed through a heat treatment, and then cut into an arbitrary size and processed into a form of a wafer, a large area may be processed at the same time to increase productivity, which may be easy to be applied to the existing FAB process.

Figure 9A:
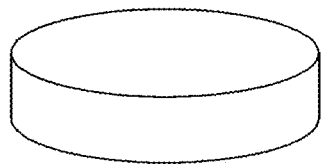
FIGS. 9A to 11B are views for illustrating a degree of freedom in design of a capacitor component in a manufacturing method according to the present disclosure.
Figure 9B:
Figure 10A:
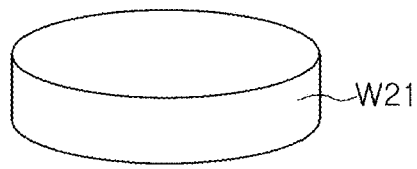
Figure 10B:
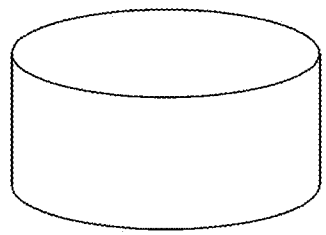
Figure 11A:
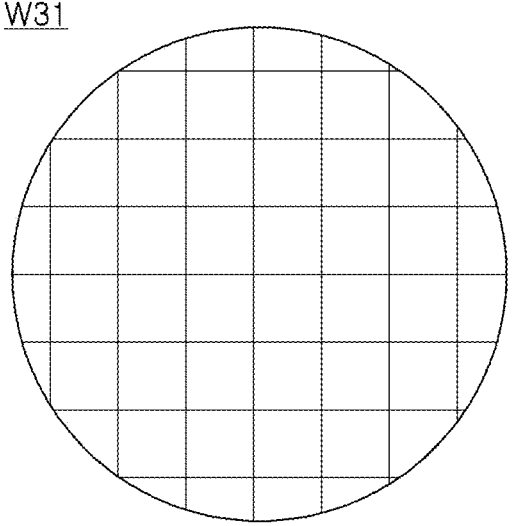
Figure 11B:
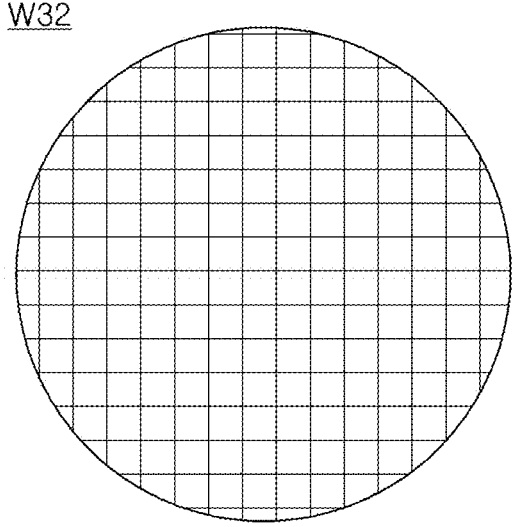

In this case, in a basic structure of the three-dimensional structure prepared in the form of a wafer, it is easy to replace a portion of the structure with a desired component or form an additional structure through the FAB process. Meanwhile, in the FAB process of the wafer, it is possible either to replace a component included in its basic structure with another necessary component or to easily reprocess the basic structure to fit the detailed structure, and it is also possible to dice the wafer into a necessary size by controlling a mask. For example, as shown in FIGS. 9A and 9B, it is possible to control each diameter of wafers W11 and W12, thereby adjusting a size of a capacitor component manufactured using these wafers in the X or Y direction. In addition, as shown in FIGS. 10A and 10B, it is possible to control each thickness of wafers W21 and W22, thereby adjusting a height Z of a capacitor component manufactured using these wafers. In addition, as shown in FIGS. 11A and 11B, it is possible to dice even wafers W31 and W32 of the same size to have inner regions of different sizes.

After preparing the wafer, a process of smoothing a surface thereof by polishing and wet etching may be performed before a subsequent process is performed.

Figure 14:
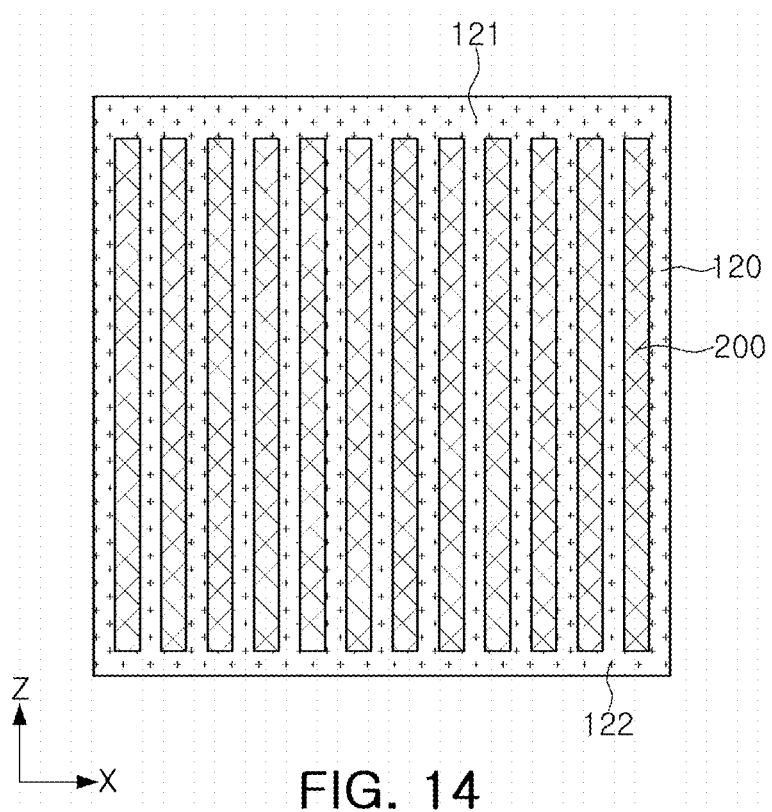

Next, as illustrated in FIG. 14, a conductive material is applied to upper and lower ends of the wafer to form a first connection conductive layer 121 physically connecting upper ends of the plurality of conductive nanowires 120 on an upper surface of the wafer, and to form a second connection conductive layer 122 physically connecting lower ends of the plurality of nanowires 120 on lower surface of the wafer.

In an embodiment, the plurality of conductive nanowires 120 serve as the first electrode portion.

Figure 15:
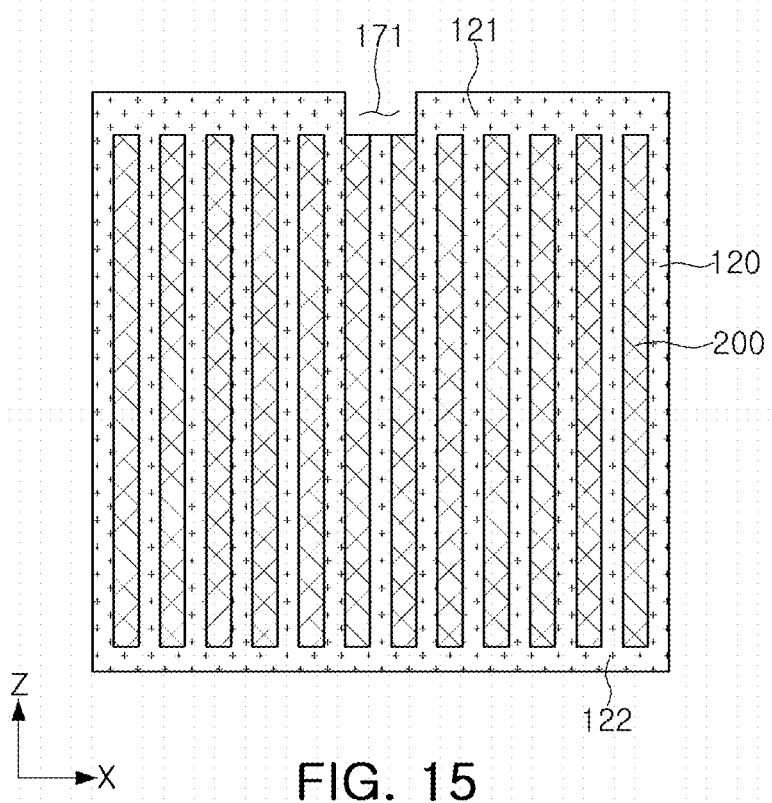

Next, as illustrated in FIG. 15, a mask manufactured in a desired shape is attached to the first connection conductive layer 121 for ALD processing of an inside of the wafer, and an open passage 171 removing a surface of a portion thereof without the mask to connect the inside and the outside, is formed.

In this case, uniformity of a unit size and detailed patterns may be controlled using a shape of the mask.

Figure 16:
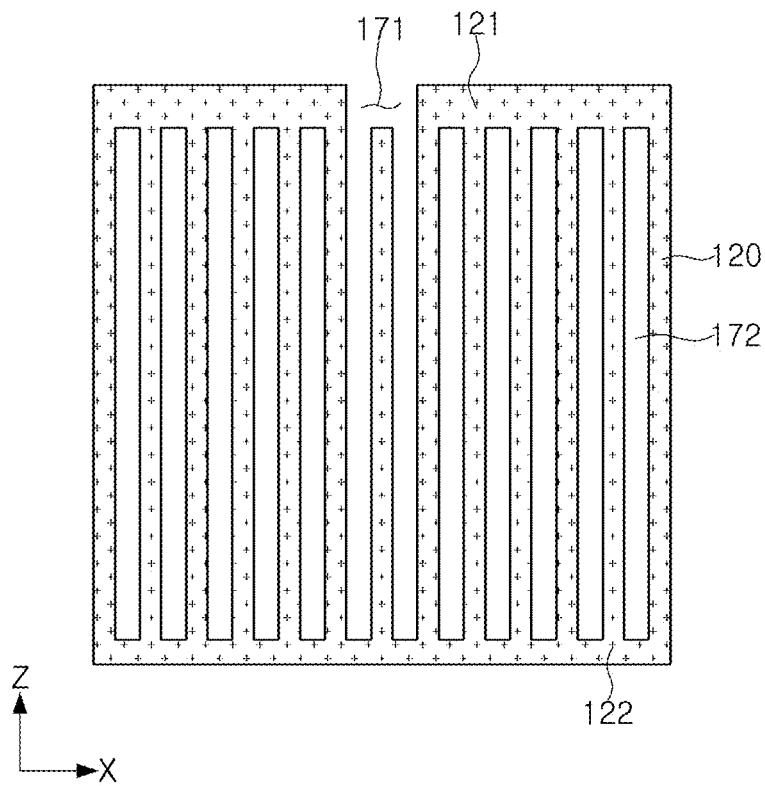
Figure 17:
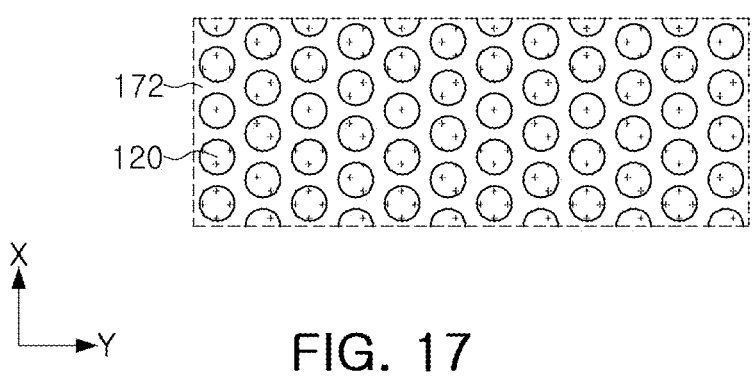

As illustrated in FIGS. 16 and 17, alumina 200 serving as a binder is removed from the wafer through a metal wet etch/oxide wet etch process through the open passage 171, and only the conductive nanowires 120 are left so that a space 172 is provided inside the wafer.

Figure 18:
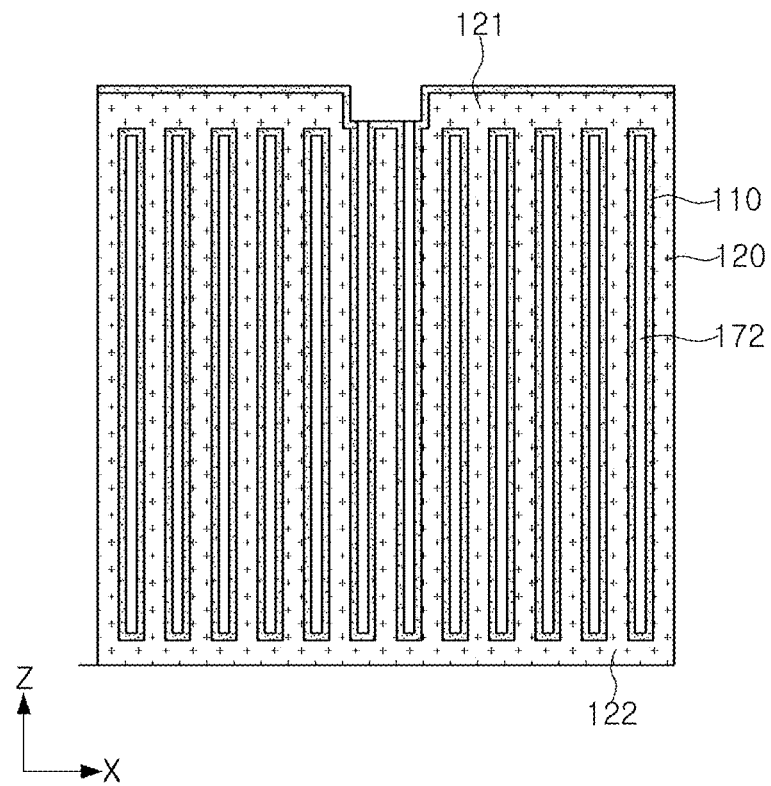
Figure 19:
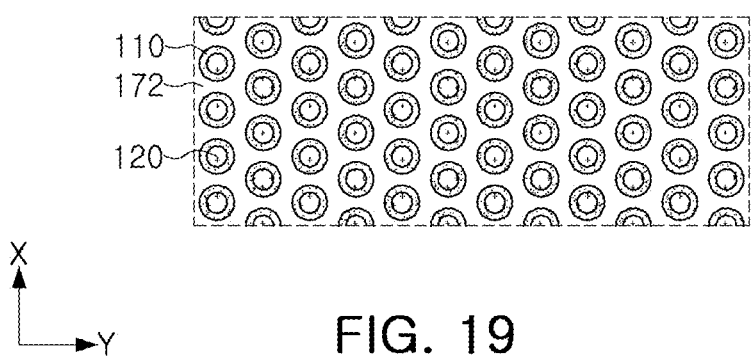

Next, as illustrated in FIGS. 18 and 19, a dielectric material is deposited in the space 172 through a process such as atomic layer deposition (ALD), and a dielectric film 110 may be formed at an outer circumferential surface of respective conductive wires 120 and an upper surface of the first connection conductive layer 121.

In this case, in some cases, multiple layers of patterns surrounding the conductive nanowires may be formed with different components through ALD control or repeated etching/deposition.

In addition, a thickness thereof may be finely controlled by a deposition technique through ALD, and thus, it is possible to manufacture three-dimensional patterns of various shapes, which are basic shapes.

For example, after a barrier metal film is further formed to cover an outer circumferential surface of the dielectric film, a process of forming a barrier dielectric; film may be further performed by depositing a dielectric material once more to cover the circumference of the barrier metal film.

Figure 20:
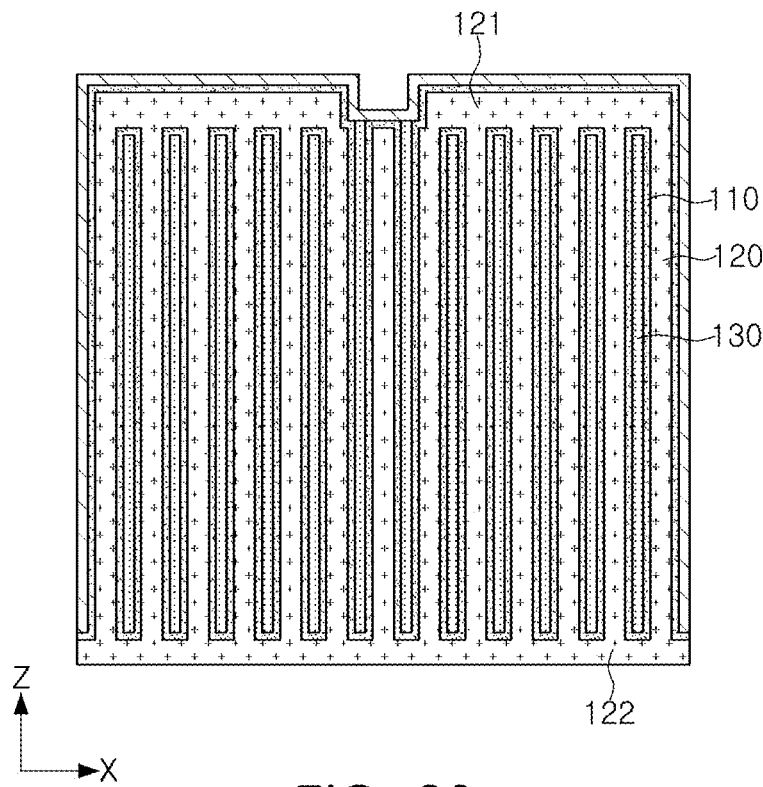
Figure 21:
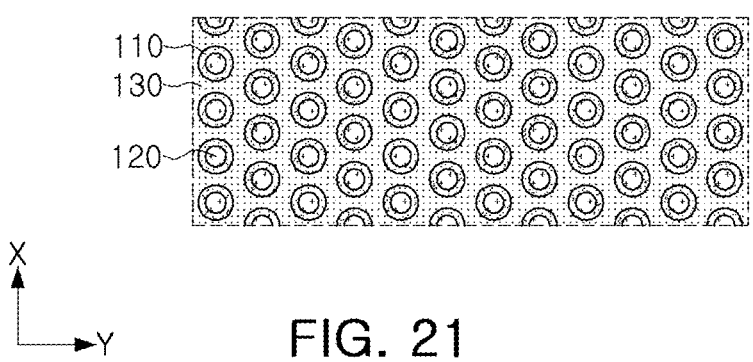

Next, as illustrated in FIGS. 20 and 21, a conductive material may be additionally deposited on a space 172 prepared by removing the alumina 200 and an upper surface of the dielectric film 110, to form a conductive body 130 connected in a form surrounding the plurality of conductive nanowires 120.

In this case, as a method of depositing the conductive material, ALD may be utilized, but the present invention is not limited thereto.

In addition, the conductive body 130 is maintained to be insulated from the plurality of conductive nanowires 120 by the dielectric film 110.

Figure 2:
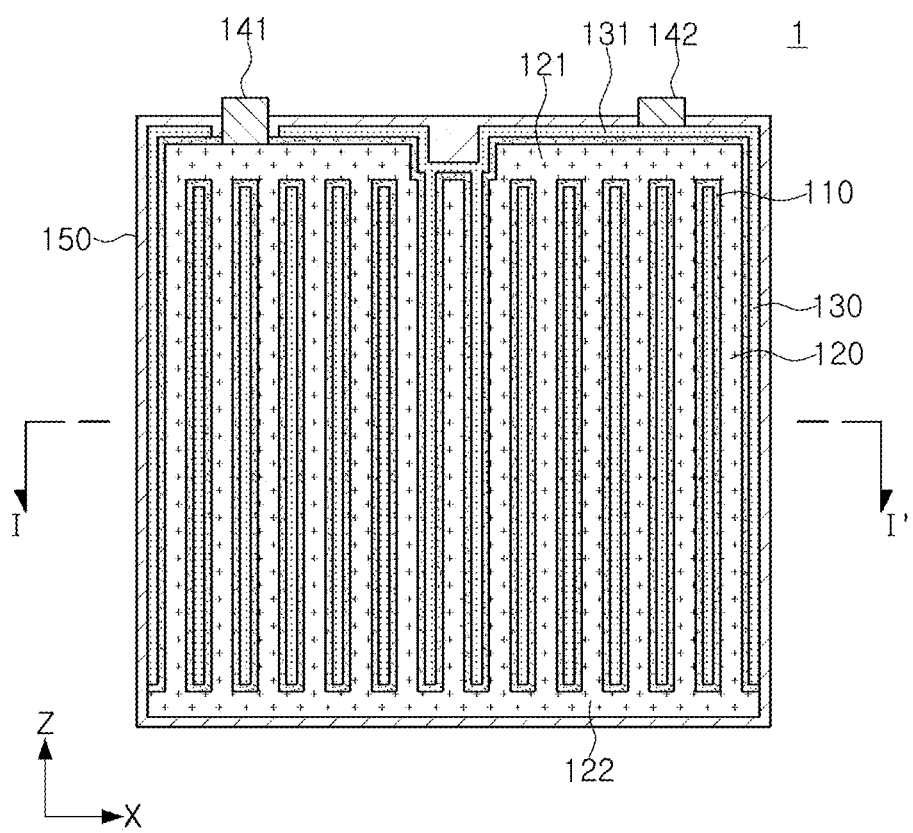
FIG. 2 is a diagram schematically illustrating a capacitor component according to an embodiment of the present disclosure.
Figure 3:
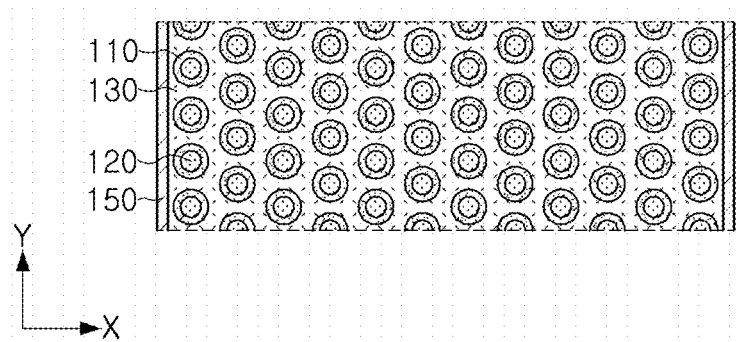
FIG. 3 is a view schematically illustrating a cross-section taken along line I-I' of FIG. 2.
Figure 22:
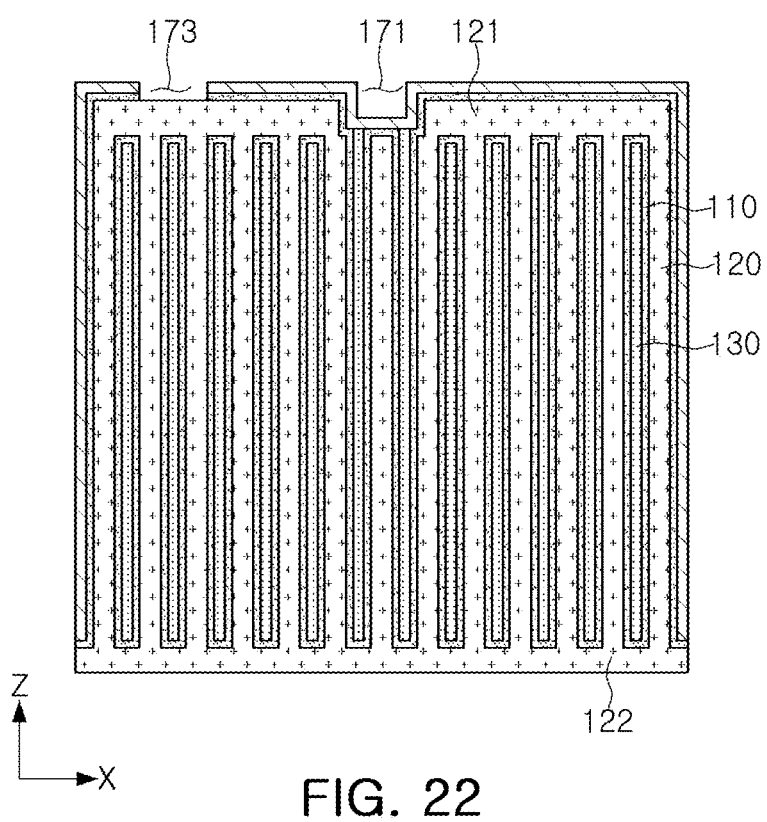

Next, as illustrated in FIG. 22, in order to form the first terminal 141 illustrated in FIG. 2 on an upper portion of the wafer, a groove portion 173 is processed to expose a first connection conductive layer 121, and a first terminal 141 is formed in the groove portion 173 to be connected to the first connection conductive layer 121. In this case, the first terminal 141 is spaced apart from a second electrode portion 130.

Next, the second terminal 142 illustrated in FIG. 2 is formed on an upper surface 131 of the second electrode portion 130.

Next, a protective layer 150 covering a surface of the second electrode portion 130 and the second connection conductive layer 122 may be formed so that portions of the first and second terminals 141 and 142 are exposed externally, so that the capacitor component 1 of FIG. 2 may be manufactured.

Figure 23:
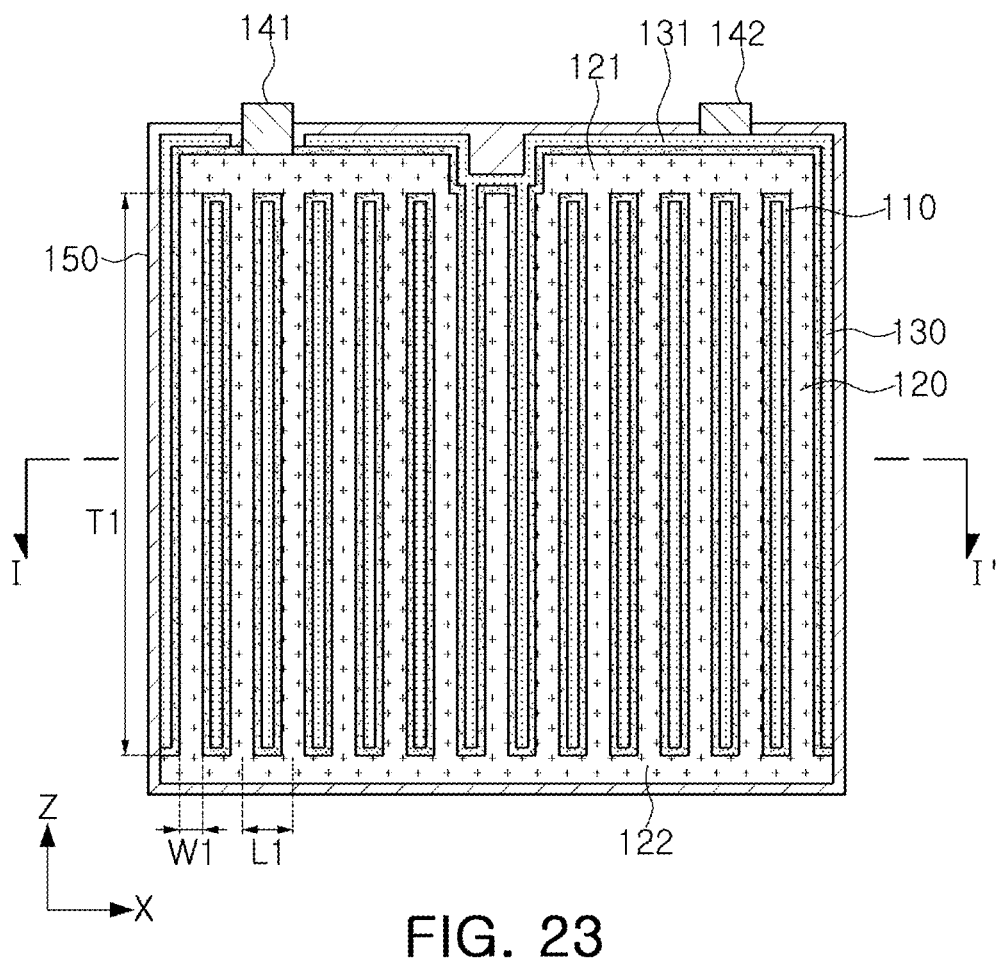
FIG. 23 is a view illustrating an aspect ratio (T1/W1) and a distance (L1) of each of conductive nanowires of a capacitor component according to an embodiment of the present disclosure.

Referring to FIG. 23, a capacitor component according to an embodiment of the present disclosure may include first and second connection conductive layers 121 and 122, spaced apart from each other, a plurality of conductive nanowires 120 respectively connecting the first and second connection conductive layers 121 and 122, and spaced apart from each other, a conductive body 130 filled between the first and second connection conductive layers 121 and 122 to have a plurality of through-holes in which a plurality of conductive nanowires 120 are disposed, and a dielectric film 110 disposed between the first and second connection conductive layers 121 and 122 so that at least a portion thereof is disposed between the plurality of conductive nanowires 120 and the conductive body 130 in the plurality of through-holes. The plurality of through holes of the conductive body 130 may correspond to the plurality of through-holes TH of FIGS. 24 to 26.

Referring to FIG. 23, a width W1 of each of the plurality of conductive nanowires 120 may be greater than 20 nm and less than 70 nm. More specifically, the width W1 of each of the plurality of conductive nanowires 120 may be 40 nm or more and 60 nm or less. A length T1 of each of the plurality of conductive nanowires 120 may be greater than 40 μm and less than 140 μm. More specifically, the length T1 of each of the plurality of conductive nanowires 120 may be 80 μm or more and 130 μm or less. Accordingly, an aspect ratio (T1/N1) of the plurality of conductive nanowires 120 may be 1000 or more. More specifically, the aspect ratio (T1/W1) of the plurality of conductive nanowires 120 may be 2000 or more and 3000 or less.

Each of the distance L1, the width W1, the length T1, and the aspect ratio (T1/W1) may be measured as an average value in several intact conductive nanowires 120 among the plurality of conductive nanowires 120 included in a cross-section of the capacitor component formed by polishing the capacitor component in a horizontal direction. The cross-section may be applied to analysis using at least one of a transmission electron microscopy (TEM), an atomic force microscope (AFM), a scanning electron microscope (SEM), an optical microscope, and a surface profiler, and L1, W1, and T1 may be measured by visual confirmation for an image obtained according to the analysis described above or image processing (e.g., pixel identification based on colors or brightness of pixels, pixel value filtering for pixel identification efficiency, distance integration between the identified pixels, or the like).

Figure 24:
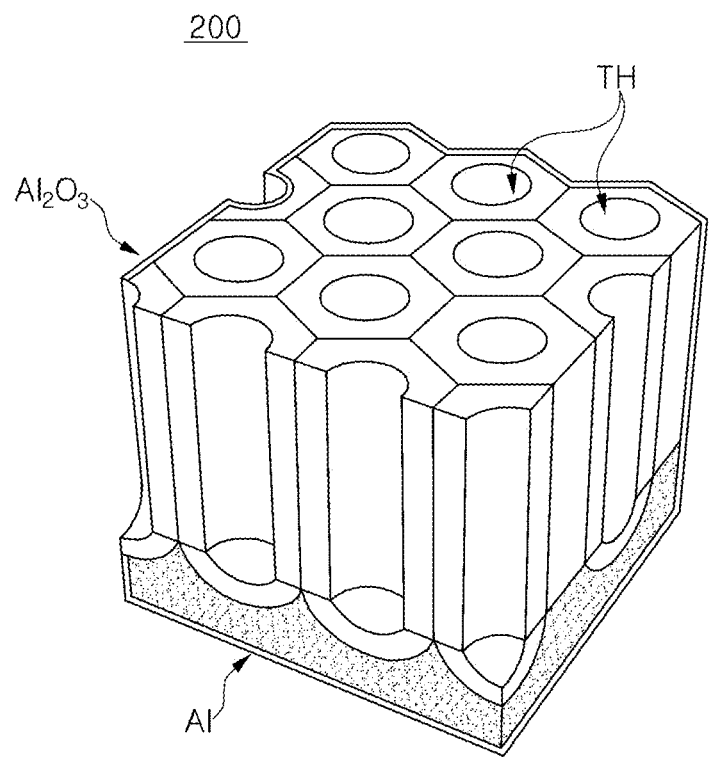
FIGS. 24 to 26 are views illustrating alumina that may be used in a process of manufacturing a capacitor component according to an embodiment of the present disclosure.
Figure 25:
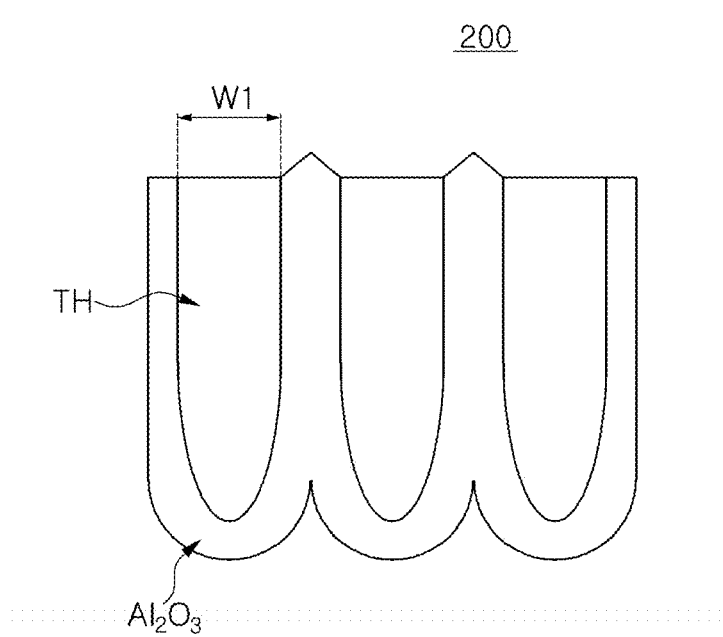
Figure 26:
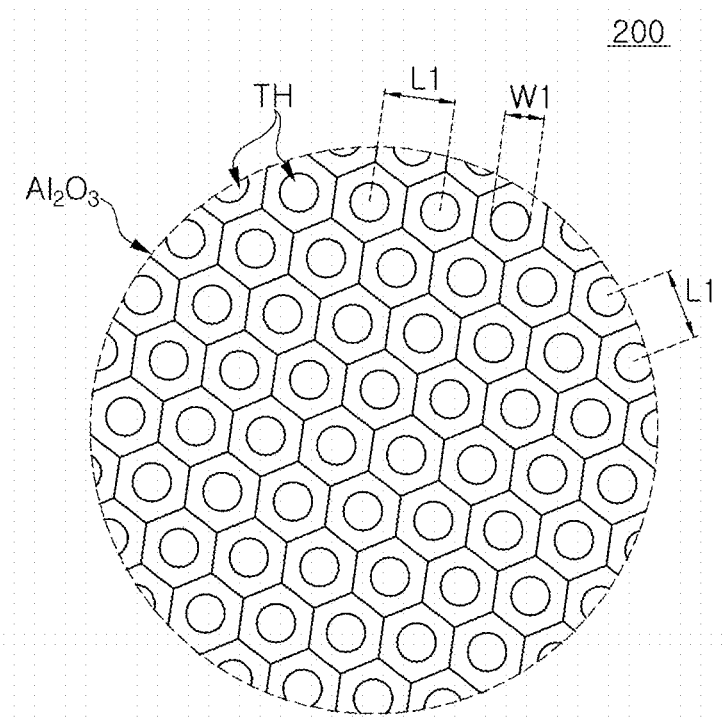

Referring to FIGS. 24 to 26, alumina ($Al_2O_3$) may have plurality of through-holes TH formed by an anodizing process, and the plurality of conductive nanowires 120 of FIGS. 12, 23, and 24 to 26 may be formed in the plurality of through-holes TH. Alumina ($Al_2O_3$) may correspond to the alumina 200 of FIGS. 12 to 15. Since the conductive body 130 of FIG. 23 may be filled in at least a portion of a space in which alumina ($Al_2O_3$) was located after alumina ($Al_2O_3$) is removed, the conductive body 130 may nave a plurality of through-holes corresponding to the plurality of through-holes T.

Since an anodizing process based on alumina ($Al_2O_3$) may form a plurality of through-holes TH having a high aspect ratio of 1000 or more (preferably 2000 or more), the anodizing process may be a process for implementing a plurality of conductive nanowires 120 having a high aspect ratio of 1000 or more (preferably 2000 or more).

Alternatively, according to the anodizing process based on alumina ($Al_2O_3$), alumina ($Al_2O_3$) may stably support side surfaces of the plurality of conductive nanowires 120 while the plurality of conductive nanowires 120 having a high aspect ratio of 1000 or more (preferably 2000 or more) are formed. Therefore, defect factors such as collapse, pattern lifting, deflection, or the like, of the plurality of conductive nanowires 120 may be suppressed.

Therefore, the capacitor component according to an embodiment of the present disclosure prepared based on an alumina ($Al_2O_3$) and/or anodizing process may include a plurality of conductive nanowires 120 having a high aspect ratio of 1000 or more (preferably 2000 or more). As the aspect ratio of the plurality of conductive nanowires 120 increases, the number of the plurality of conductive nanowires 120 that can be disposed within a unit horizontal area may increase. Since the capacity of the capacitor component may increase as the number of the plurality of conductive nanowires 120 increases, the larger the number of the plurality of conductive nanowires 120 that can be disposed within a unit horizontal area, the higher the capacitance compared to an overall size of the capacitor component.

For example, since the aspect ratio of a plurality of deep trenches of a capacitor component formed based on a plurality of deep trenches of a general silicon wafer is about several tens, it may be lower than the capacitance of the capacitor component compared to the overall size of the capacitor component according to an embodiment of the present disclosure.

In addition, an alumina ($Al_2O_3$) and/or anodizing process that can be used to manufacture a capacitor component according to an embodiment of the present disclosure may be cheaper than a process of forming a plurality of deep trenches of a common silicon wafer, so that productivity of the capacitor component according to an embodiment of the present disclosure may also be higher.

The length T1 of each of the plurality of conductive nanowires 120 may be determined according to an overall thickness of the capacitor component. Since the overall thickness of the capacitor component may be one of standards required for the capacitor component, the length T1 of each of the plurality of conductive nanowires 120 may also vary depending on the type of capacitor component. For example, when the overall thickness required for the capacitor component is 60 μm, the length T1 of each of the plurality of conductive nanowires 120 may be 50 μm or more and less than 60 μm.

According to the anodizing process, as the length T1 of each of the plurality of conductive nanowires 120 decreases, the width W1 of each of the plurality of conductive nanowires 120 may also be narrower. Therefore, the aspect ratio (T1/W1) of the plurality of conductive nanowires 120 may not be greatly affected by the overall thickness of the capacitor component, and may be 1000 or more (preferably 2000 or more).

Alumina ($Al_2O_3$) of FIG. 24 may be formed on the lower aluminum layer (Al). For example, alumina ($Al_2O_3$) may be formed by anodizing in a portion or an aluminum (Al) layer, and the plurality of through-holes T1 of alumina ($Al_2O_3$) may be formed by a self-organizing action when alumina ($Al_2O_3$) is formed. For example, in the anodizing process, an electrolyte solution such as oxalic acid may be used as an anode, and the anodizing process may include a process of applying a voltage to the electrolyte solution. For example, a portion, close to the aluminum (Al) layer in the plurality of through-holes TH of FIG. 25 may have a diameter, narrower than the width of each of the plurality of through-holes TH, and be removed by horizontal cutting or etching. Accordingly, as in the case of the alumina 200 of FIG. 12, variation in diameters of the plurality of through-holes TH may be almost eliminated.

Referring to FIG. 26, a horizontal cross-section of at least a portion of the plurality of through-holes may have a shape close to an ellipse or a shape close to a polygon, rather than a perfect circle. A diameter of the shape close to an ellipse or a shape close to a polygon may be an average value of lengths of portions disposed within the ellipse from a virtual line passing through a center of the ellipse. The average value may be an average value of measurement values obtained by repeatedly measuring the length while rotating the direction of the virtual line by a specific angle.

Referring to FIG. 23, a distance L1 between the plurality of conductive nanowires 120 may be 80 nm or more and 120 nm or less, and the distance L1 between the plurality of conductive nanowires 120 may be longer than a width W1. A relationship between the distance L1 and the width W1 and the distance L1 may be implemented by an anodizing process of alumina ($Al_2O_3$), but the present disclosure is not limited thereto.

Figure 27:
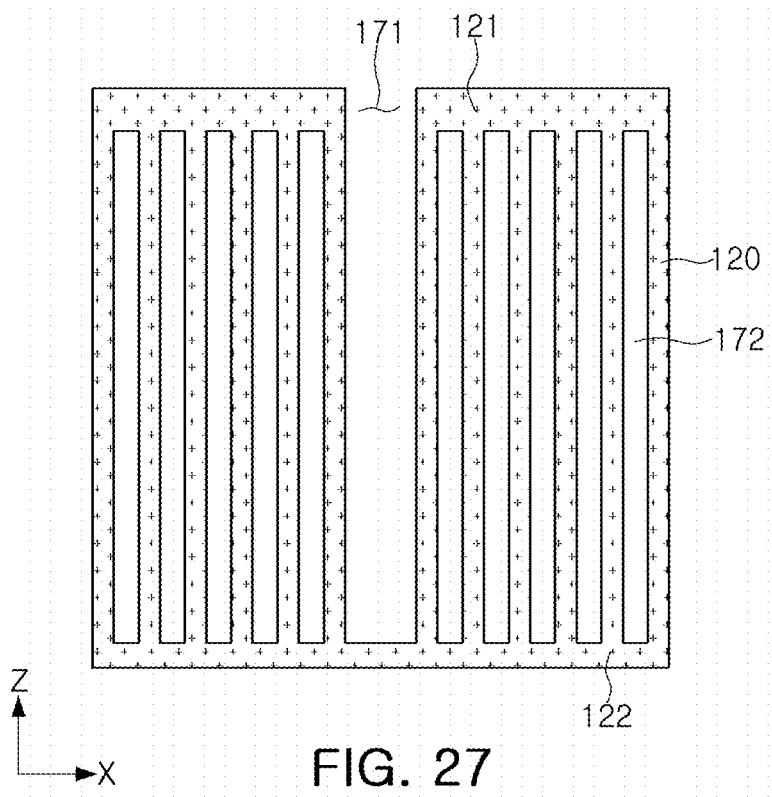
FIGS. 27 to 33 are views illustrating modified embodiments of FIGS. 16 to 22.
Figure 28:
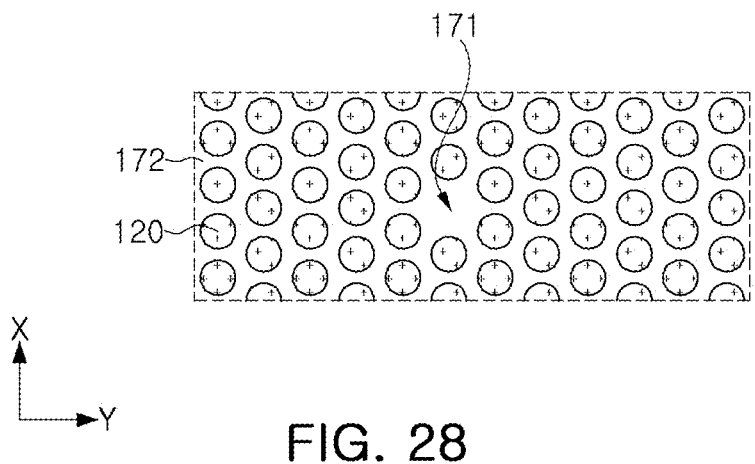

The open passage 171 of FIGS. 27 and 28 may have a structure in which the conductive nanowires disposed in the open passage 171 of FIG. 16 among the plurality of conductive nanowires 120 of FIG. 15 are etched. For example, the conductive nanowires disposed in the open passage 171 of FIG. 16 may be selectively etched according to a wet etch method prior to alumina 200, and then the alumina 200 may also be etched according to a wet etch) method. A photo resist may be temporarily formed on an upper surface of a portion of the plurality of conductive nanowires 120 before the alumina 200 is etched, and may be removed after the alumina 200 is etched.

Figure 29:
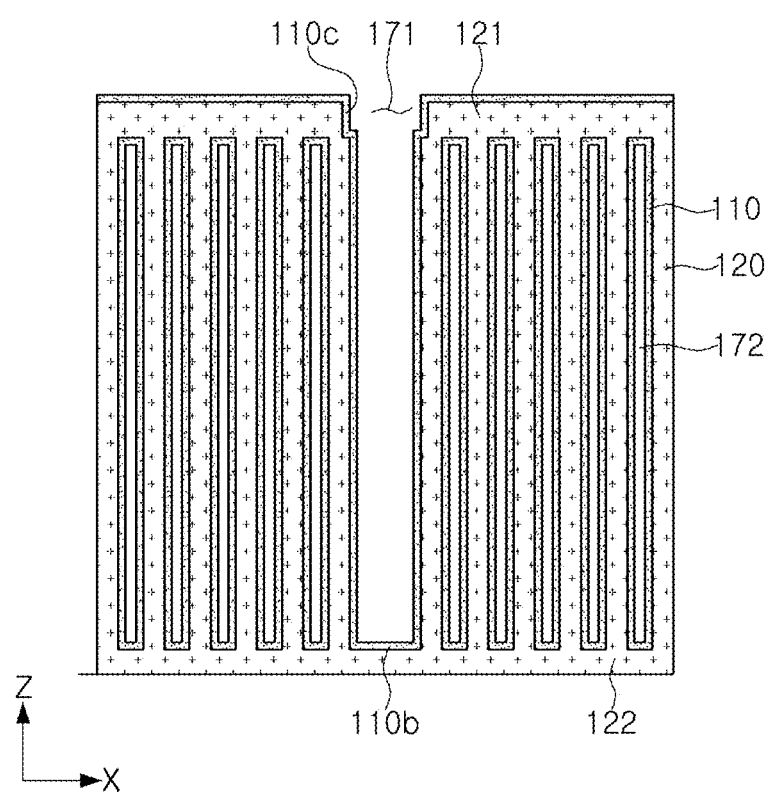
Figure 30:
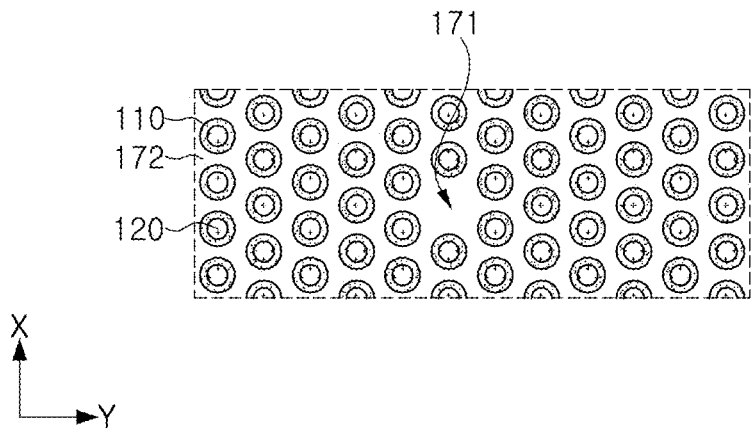

The dielectric film 110 of FIGS. 29 and 30 may be formed by atomic layer deposition (ALD), and may also be formed on a lower surface of the open passage 171. Thickness uniformity of the dielectric film 110 formed by atomic layer deposition (ALD) may be higher than when formed by other processes. Depending on the design, the dielectric film 110 can then be annealed. In view of the alumina 200, the dielectric film 110 and the conductive body 130 may be formed in an outer stack structure.

As the alumina 200 is etched, a degree of design freedom of a space between the first and second connection conductive layers 121 and 122 may be further increased. For example, a portion of the space filled with alumina 200 may be advantageous in that the barrier metal film 125 and the barrier dielectric film 111 illustrated in FIG. 8 are further added, and may be advantageous to widen a controllable range of the width and/or distance of the plurality of conductive nanowires 120.

The dielectric film 110 may contact upper, lower, and side surfaces of the plurality of conductive nanowires 120 and contact an inner side surface of the conductive body 130. Accordingly, since the capacitor component according to an embodiment of the present disclosure not only forms capacitance in a horizontal direction through the side surfaces of the plurality of conductive nanowires 120, but also forms capacitance in a vertical direction through the upper and lower surfaces of the plurality of conductive nanowires 120, capacitance increasing efficiency of the capacitor component can be further improved.

The first connection conductive layer 121 may have an open passage 171 open through which a portion of the conductive body 130 is exposed, and the other portion 110b of the dielectric film 110 may be disposed between the portion 130b in the conductive body 130 exposed through the open passage 171 and the second connection conductive body 122. Accordingly, additional capacitance may also be formed on a lower side of the open passage 171.

The plurality of conductive nanowires 120 may be arranged to surround a portion 130b of the conductive body 130 exposed through the open passage 171. Accordingly, since the capacitance formed in the plurality of conductive nanowires 120 can be efficiently collected through the open passage 171, equivalent series inductance (ESL) of the capacitor component according to an embodiment of the present disclosure can be further reduced.

Figure 31:
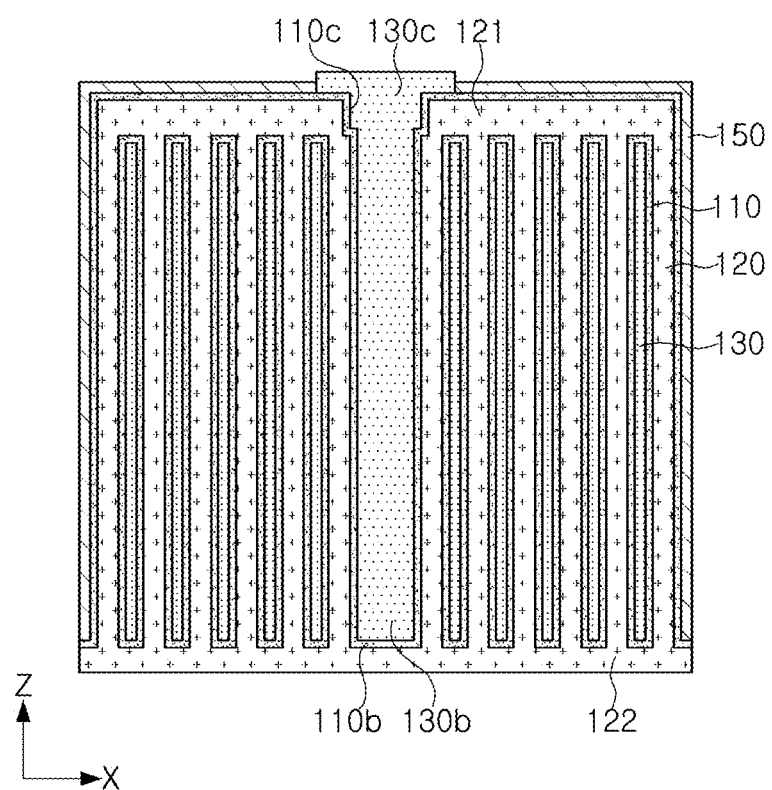
Figure 32:
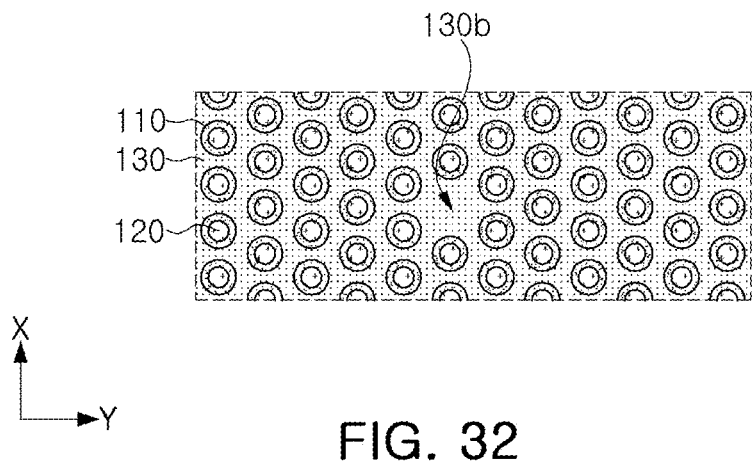

The conductive body 130 of FIGS. 31 and 32 may be filled with a space filled with alumina between the first and second connection conductive layers 121 and 122, and a portion 130b thereof may also be formed in the open passage 171. The conductive body 130 may not only serve as an electrode for forming capacitance, but also serve to improve overall durability of the capacitor component based on strong strength of a conductive material, and also serve to improve overall moisture resistance reliability of the capacitor component based on high density according to the process of forming the conductive body 130.

Figure 34:
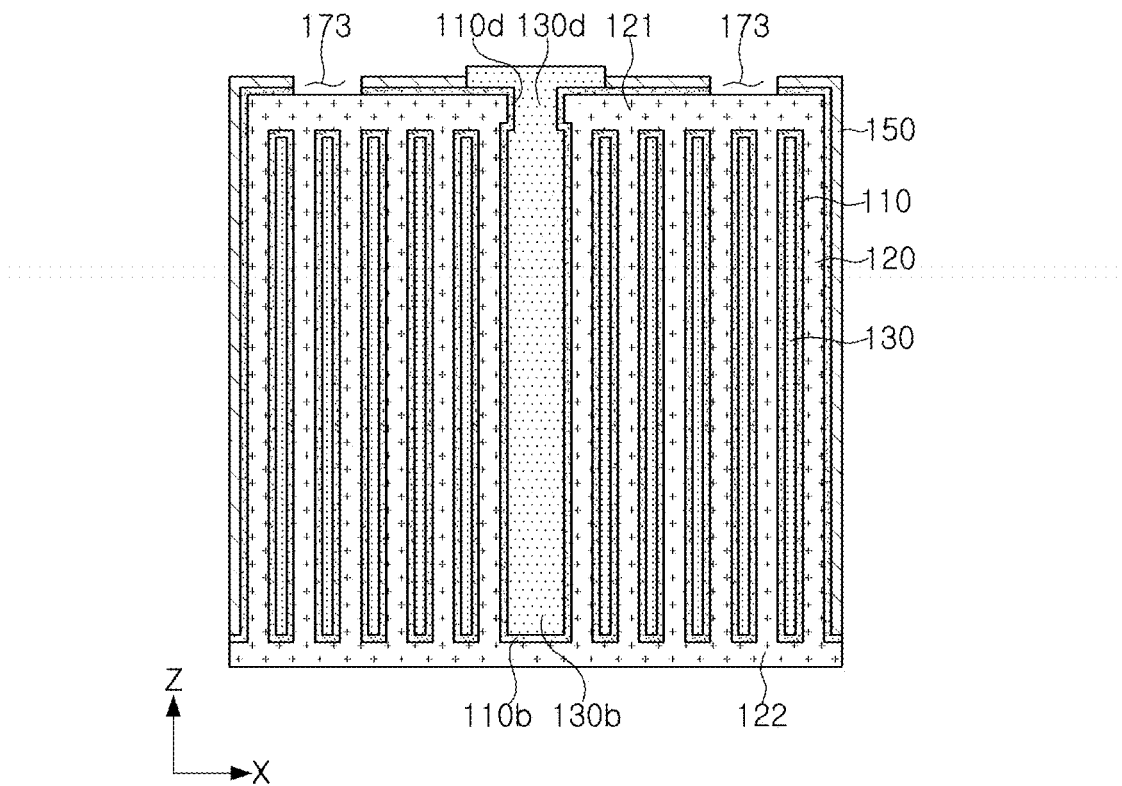
FIG. 34 is a diagram illustrating a modified embodiment of the capacitor component of FIG. 33.

A portion 130b of the conductive body 130 disposed in the open passage 171 may have a protruding portion 130c protruding further upwardly than an upper surface of the first connection conductive layer 121, and a protruding portion 130c may be used as a second terminal (function similar to 142 in FIG. 23) capable of providing capacitance of the capacitor component externally. The number of parts protruding upwardly from the conductive body 130 may be one or more. The protruding portion 130c may be surrounded by an upper portion 110c of the dielectric layer 110, and a width of the protruding portion 130c may be wider than that of the portion 130b of the conductive body 130. Referring to FIG. 34, a width of the protruding portion 130d may be narrower than that of the portion 130b of the conductive body 130.

A layer covering a portion of the dielectric films 110 of FIGS. 31 and 32 disposed on an outermost portion of the capacitor component may correspond to the protective layer 150 of FIG. 23, and may be formed after the conductive body 130 is formed. For example, the protective layer 150 may be implemented with polyimide to reduce an influence of external physical influence on the capacitor component.

Figure 33:
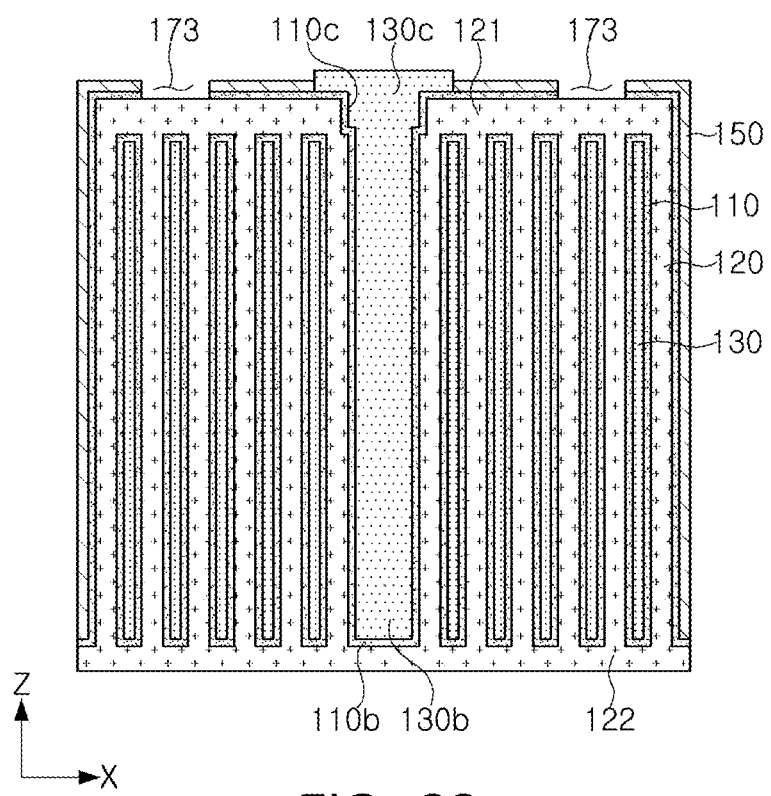

One or more groove portions 173 of FIGS. 33 and 34 may be formed on the first connection conductive layer 121, and may be used as a dispositional space for a first terminal (141 in FIG. 23) capable of supplying capacitance of a capacitor component externally. For example, the groove portion 173 may be formed by wet etching using photoresist.

Thereafter, a process of passivating an upper surface of the capacitor component may be performed, and a process of forming the first terminal (141 in FIG. 23) in the groove portion 173 may be performed, and a process of passivating the first terminal may be performed. Then, according to the design, a process of forming a portion of the conductive body 130 protruding upwardly and under bump metallurgy (UBM) on an upper surface of a first terminal and a process of plating the protruding portion and the first terminal may be performed.

Figure 35:
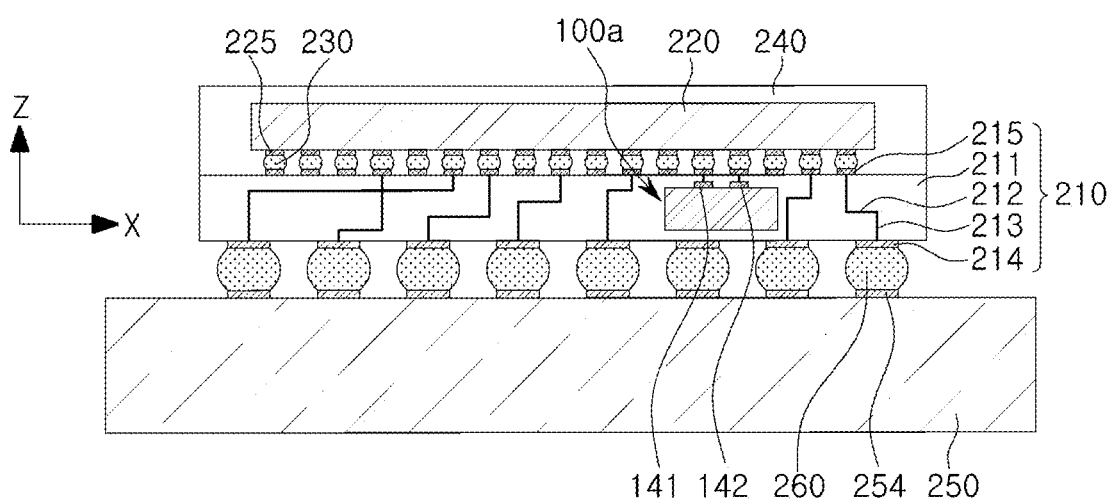
FIG. 35 is a diagram illustrating a semiconductor package including a capacitor component according to an embodiment of the present disclosure.

Referring to FIG. 35, a semiconductor package according to an embodiment of the present disclosure may include a semiconductor chip 220, a redistribution structure 210, and a capacitor component 100a such as the above-described capacitor component.

The redistribution structure 210 may include a redistribution 212 electrically connected to the semiconductor chip 220. A line width and pitch of the redistribution 212 may be smaller than those of a common printed circuit board. Accordingly, the redistribution structure 210 may also be smaller than a common printed circuit board. For example, the redistribution structure 210 may further include a redistribution insulating layer 211, redistribution vias 213, and redistribution pads 214 and 215, respectively, and may correspond to an insulating layer, a via, and a pad, of the printed circuit board, respectively. For example, the redistribution structure 210 may be implemented according to a wafer level package (WLP) or a panel level package (PLP).

The semiconductor chip 220 may include a logic semiconductor chip and/or a memory semiconductor chip. The logic semiconductor chip may be a microprocessor, for example, a central processing unit (CPU), a graphic processing unit (GPU), a field programmable gate array (FPGA), an application processor (AP), a digital signal processor, a cryptographic processor, a controller, or an application specific integrated circuit (ASIC). The memory semiconductor chip may be a volatile memory such as dynamic random access memory (DRAM) or static random access memory (SRAM) or a non-volatile memory such as flash memory.

For example, the semiconductor chip 220 may be molded by a molding unit 240 such as an epoxy molding compound (EMC), and may have a chip pad 225 through which signals or power are input and output. The semiconductor chip 220 may be mounted on the redistribution structure 210 through a chip bump 230. The redistribution structure 210 may be mounted on a pad 254 on the printed circuit board 250 through a substrate bump 260.

The capacitor component 100a according to an embodiment of the present disclosure may be electrically connected to the semiconductor chip 220 and disposed on the redistribution structure 210. For example, the capacitor component 100a may be embedded in the redistribution structure 210 or mounted on a lower surface of the redistribution structure 210. For example, since the capacitor component 100a may overlap the semiconductor chip 220 in a Z-direction, which may be used as a land side capacitor (LSC).

Compared to the MLCC, the capacitor component 100a according to an embodiment of the present disclosure may be more advantageous in reducing the thickness, and thus may be advantageous in being disposed on the redistribution structure 210. Accordingly, since an electrical distance between the capacitor component 100a and the semiconductor chip 220 may be shortened, the capacitor component 100a may be advantageous to improve signal integrity of signals input/output to the semiconductor chip 220 or power integrity of power input/output to the semiconductor chip 220.

In addition, as an operating frequency of the semiconductor chip 220 increases or a current consumption increases, the capacitor component 100a is a decoupling capacitor, and low ESL may be required to increase the efficiency of reducing high-frequency noise of the semiconductor chip 220. Compared to the MLCC, the capacitor component 100a according to an embodiment of the present disclosure may have a structure advantageous for lowering equivalent series inductance (ESL), so that high-frequency noise of the semiconductor chip 220 may be effectively reduced. For example, the ESL of the MLCC may be about 100 pH, and the ESL of the capacitor component 100a may be less than 5 pH.

As set forth above, according to an embodiment of the present disclosure, a capacitor component and a manufacturing method of the capacitor component, which may be advantageous for lowering ESL or reducing a thickness thereof compared to an MLCC, and may also obtain capacitance increasing efficiency (which does not mean relative efficiency with respect to the MLCC).

In addition, according to an embodiment of the present disclosure, the capacitor component, which may overcome limitations of miniaturization and high capacitance of the conventional capacitor having a three-dimensional structure, may be advantageous to have a higher degree of freedom in design or to reduce a process cost compared to the conventional capacitor having a three-dimensional structure, and may be advantageous to have stronger strength or higher moisture resistance reliability.

In the present specification, the expression 'an embodiment' used in the present disclosure does not mean the same embodiment, and is provided to emphasize and describe different unique characteristics. However, an embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While example embodiments have been shown and described above, it will be apparent to those skilled in the art that modifications and variations could be made without departing from the scope of the present invention as defined by the appended claims.

What is claimed is:

1. A capacitor component, comprising:
   first and second connection conductive layers;
   a plurality of conductive nanowires respectively connecting the first and second connection conductive layers;
   a conductive body disposed between the first and second connection conductive layers to have a plurality of through-holes in which the plurality of conductive nanowires are disposed; and
   a dielectric film disposed so that at least a portion thereof is disposed between the plurality of conductive nanowires and the conductive body in the plurality of through-holes,
   wherein an aspect ratio, which is a ratio of a length to a width of one of the plurality of conductive nanowires, is 1000 or more, and
   the first connection conductive layer has an open passage through which a portion of the conductive body is exposed.

2. The capacitor component of claim 1, wherein the aspect ratio is 2000 or more and 3000 or less.

3. The capacitor component of claim 1, wherein the length of the one of the plurality of conductive nanowires is greater than 40 μm and less than 140 μm, and
   the width of the one of the plurality of conductive nanowires is greater than 20 nm and less than 70 nm.

4. The capacitor component of claim 3, wherein the length of the one of the plurality of conductive nanowires is 80 μm or more and 130 μm or less, and
   the width of the one of the plurality of conductive nanowires is 40 nm or more and 60 nm or less.

5. The capacitor component of claim 1, wherein a distance between the one of the plurality of conductive nanowires and another of the plurality of conductive nanowires is 80 nm or more and 120 nm or less.

6. The capacitor component of claim 1, wherein a distance between the one of the plurality of conductive nanowires and another of the plurality of conductive nanowires is longer than a width of the one of the plurality of conductive nanowires.

7. The capacitor component of claim 1, wherein the dielectric film is in contact with upper surfaces, lower surfaces, and side surfaces of the plurality of conductive nanowires, and is in contact with an inner side surface of the conductive body.

8. The capacitor component of claim 1, wherein
   the other portion of the dielectric film is disposed between the portion of the conductive body exposed through the open passage and the second connection conductive layer.

9. The capacitor component of claim 1, wherein
   the plurality of conductive nanowires are arranged to surround a portion of the conductive body exposed through the open passage.

10. The capacitor component of claim 1, further comprising:
    a protective layer covering an outer surface of the first connection conductive layer;
    a first terminal connected to the first connection conductive layer and exposed through the protective layer; and a second terminal connected to the conductive body and exposed through the protective layer.

11. The capacitor component of claim 1, further comprising:
a protective layer covering an outer surface of the first connection conductive layer and an outer surface of the second connection conductive layer and surrounding the conductive body.

12. The capacitor component of claim 11, wherein the protective layer includes a material different from silicon, and
the protective layer provides an upper outer surface and a lower outer surface of the capacitor component.

13. The capacitor component of claim 11, wherein the protective layer contains polyimide.

14. The capacitor component of claim 1, wherein the plurality of conductive nanowires contain at least one of titanium nitride (TiN), an alloy of titanium nitride, tungsten nitride (WN), and an alloy of tungsten nitride, and
the conductive body contains at least one of titanium nitride (TiN), an alloy of titanium nitride, tungsten nitride (WN), and an alloy of tungsten nitride.

15. The capacitor component of claim 1, wherein the dielectric film comprises an oxide film containing oxide and a nitride film disposed on the oxide film and containing silicon nitride (SiN).

16. The capacitor component of claim 1, further comprising:
a barrier metal film surrounding an outer circumferential surface of the dielectric film; and
a barrier dielectric film disposed between the barrier metal film and the conductive body.

* * * * *